(12) United States Patent
Feng et al.

(10) Patent No.: US 11,455,542 B2
(45) Date of Patent: Sep. 27, 2022

(54) TEXT PROCESSING METHOD AND DEVICE BASED ON AMBIGUOUS ENTITY WORDS

(71) Applicant: BEIJING BAIDU NETCOM SCIENCE AND TECHNOLOGY CO., LTD., Beijing (CN)

(72) Inventors: Zhifan Feng, Beijing (CN); Chao Lu, Beijing (CN); Yong Zhu, Beijing (CN); Ying Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 389 days.

(21) Appl. No.: 16/236,570

(22) Filed: Dec. 30, 2018

(65) Prior Publication Data
US 2019/0220749 A1      Jul. 18, 2019

(30) Foreign Application Priority Data

Jan. 17, 2018   (CN) .......................... 201810044364.8

(51) Int. Cl.
*G06N 3/08*    (2006.01)
*G06N 5/02*    (2006.01)
(Continued)

(52) U.S. Cl.
CPC ........... *G06N 3/088* (2013.01); *G06F 40/295* (2020.01); *G06F 40/30* (2020.01); *G06N 3/0454* (2013.01);
(Continued)

(58) Field of Classification Search
CPC .......... G06N 3/088; G06N 20/00; G06N 5/02; G06N 5/022; G06N 3/02; G06N 3/04;
(Continued)

(56) References Cited

U.S. PATENT DOCUMENTS

2016/0189047 A1*  6/2016  Meij ..................... G06F 40/295
                                                                706/11

FOREIGN PATENT DOCUMENTS

| CN | 101566998 A | 10/2009 |
| CN | 104391963 A | 3/2015 |

(Continued)

OTHER PUBLICATIONS

Bilgin et. al., "Sentiment analysis on Twitter data with semi-supervised Doc2Vec", 2017, International Conference on Computer Science and Engineering, 2017, pp. 661-666 (Year: 2017).*

(Continued)

*Primary Examiner* — Nicholas Klicos
*Assistant Examiner* — Leonard A Sieger
(74) *Attorney, Agent, or Firm* — Lathrop GPM LLP

(57) ABSTRACT

The present disclosure provides a text processing method and device based on ambiguous entity words. The method includes: obtaining a context of a text to be disambiguated and at least two candidate entities represented by the text to be disambiguated; generating a semantic vector of the context based on a trained word vector model; generating a first entity vector of each of the at least two candidate entities based on a trained unsupervised neural network model; determining a similarity between the context and each candidate entity; and determining a target entity represented by the text to be disambiguated in the context.

14 Claims, 6 Drawing Sheets

(51) Int. Cl.
   *G06N 3/04* (2006.01)
   *G06F 40/30* (2020.01)
   *G06F 40/295* (2020.01)
   *G06N 20/00* (2019.01)

(52) U.S. Cl.
   CPC .............. *G06N 5/02* (2013.01); *G06N 5/022* (2013.01); *G06N 20/00* (2019.01)

(58) Field of Classification Search
   CPC .... G06N 3/0454; G06N 20/20; G06F 40/279; G06F 40/289; G06F 40/295; G06F 40/30
   See application file for complete search history.

(56) References Cited

FOREIGN PATENT DOCUMENTS

| | | | |
|---|---|---|---|
| CN | 105630901 A | | 6/2016 |
| CN | 105894088 A | | 8/2016 |
| CN | 106055675 A | | 10/2016 |
| CN | 106295796 A | | 1/2017 |
| CN | 106855853 A | | 6/2017 |
| CN | 107102989 A | * | 8/2017 |
| CN | 107102989 A | | 8/2017 |
| WO | WO 2016210203 A1 | | 12/2016 |

OTHER PUBLICATIONS

Li et. al., "Distributed Representations of Sentences and Documents", 2014, arXiv, v 1405.4053v2, pp. 1-9 (Year: 2014).*
Liou et. al., "Autoencoder for words", 2014, Neurocomputing, vol. 139, pp. 84-96 (Year: 2014).*
Zwicklbauer et. al., "Robust and Collective Entity Disambiguation through Semantic Embeddings", 2016, In Proceedings of the 39th International ACM SIGIR conference on Research and Development in Information Retrieval, 2016, pp. 425-434 (Year: 2016).*
Amiri et. al., "Learning Text Pair Similarity with Context-sensitive Autoencoders", 2016, Proceedings of the 54th Annual Meeting of the Association for Computational Linguistics, 54-1, pp. 1882-1892 (Year: 2016).*
Mikolov et. al., "Distributed Representations of Words and Phrases and their Compositionality", 2013, Advances in Neural Information Processing Systems, 26, pp. 1-9 (Year: 2013).*
Francis-Landau et. al., "Capturing Semantic Similarity for Entity Linking with Convolutional Neural Networks", 2016, pp. 1256-1261 (Year: 2016).*
Perianin et. al., "Exploiting Synonymy and Hypernymy to Learn Efficient Meaning Representations", 2016, International Conference on Asian Digital Libraries, 2016, pp. 137-143 (Year: 2016).*
European Patent Application No. 18215238.9 extended Search and Opinion dated May 22, 2019, 15 pages.
Francis-Landau, M. et al: "Capturing Semantic Similarity for Entity Linking with Convolutional Neural Networks", Cornell University Library, Apr. 4, 2016, 7 pages.
Sun, Y. et al.: "Modeling mention, context and entity with neural networks for entity disambiguation" Proceedings of the 24th International Conference on Artificial Intelligence, pp. 1333-1339, Buenos Aires, Argentina, Jul. 25-31, 2015, 7 pages.
Korean Patent Application No. 10-2018-0115856 Office Action dated Oct. 21, 2019, 7 pages.
Korean Patent Application No. 10-2018-0115856 English translation of Office Action dated Oct. 21, 2019, 6 pages.
Kim, M, et al., Word Sense Disambiguation using Semantic Relations in Korean WordNet (2011) pp. 554-564.
Chinese Patent Application No. 201810044364.8 First Office Action dated Dec. 18, 2020, 7 pages.
Chinese Patent Application No. 201810044364.8 English translation of First Office Action dated Dec. 18, 2020, 7 pages.
Chen, W. "Entity Linking Research Based on Semantic Representation and Graph Regularization" Thesis, May 2016, 57 pages.

* cited by examiner

TEXT PROCESSING METHOD AND DEVICE BASED ON AMBIGUOUS ENTITY WORDS

CROSS-REFERENCE TO RELATED APPLICATION

This application is based on and claims priority to Chinese Patent Application Serial No. 201810044364.8, filed on Jan. 17, 2018, the entire content of which is incorporated herein by reference.

FIELD

The present disclosure relates to a natural language processing technology field, and more particularly to a text processing method and device based on ambiguous entity words.

BACKGROUND

With the popularity of the mobile Internet, Weibo, Post Bar and major news websites have greatly facilitated people's lives. However, most of the data on these platforms exist in an unstructured or semi-structured form, resulting in a large number of ambiguous entity words in the data in knowledge bases of these platforms. By disambiguating the ambiguous entity words, it is possible to discern which thing is actually indicated in different contexts, so as to facilitate subsequent specific applications.

However, in the related art, one way of disambiguating is to use existing knowledge base data to calculate text overlap degree and relevance; another way is to disambiguate the ambiguous entity words based on semantics and using existing knowledge base data to perform unsupervised or semi-supervised model training.

SUMMARY

Embodiments of a first aspect of the present disclosure provide a text processing method based on ambiguous entity words, including: obtaining a context of a text to be disambiguated and at least two candidate entities represented by the text to be disambiguated, in which the at least two candidate entities have different semantics; generating a semantic vector of the context based on a trained word vector model; generating a first entity vector of each of the at least two candidate entities based on a trained unsupervised neural network model, in which text semantics of respective entities and a relationship between entities have been learned by the unsupervised neural network model; determining a similarity between the context and each candidate entity according to the semantic vector of the context and the first entity vector of each of the at least two candidate entities; and determining a target entity represented by the text to be disambiguated in the context from the at least two candidate entities according to the similarity between the context and each candidate entity.

Embodiments of a second aspect of the present disclosure provide a text processing device based on ambiguous entity words, including: an obtaining module, configured to obtain a context of a text to be disambiguated and at least two candidate entities represented by the text to be disambiguated, in which the at least two candidate entities have different semantics; a generating module, configured to generate a semantic vector of the context based on a trained word vector model, and to generate a first entity vector of each of the at least two candidate entities based on a trained unsupervised neural network model, in which text semantics of respective entities and a relationship between entities have been learned by the unsupervised neural network model; a first determining module, configured to determine a similarity between the context and each candidate entity according to the semantic vector of the context and the first entity vector of each of the at least two candidate entities; and a first processing module, configured to determine a target entity represented by the text to be disambiguated in the context from the at least two candidate entities according to the similarity between the context and each candidate entity.

Embodiments of a third aspect of the present disclosure provide a computer device, including: a memory, a processor and computer programs stored on the memory and executable by the processor. When the processor executes the computer programs, the computer device implements the text processing method based on ambiguous entity words according to embodiments of the first aspect of the present disclosure.

Embodiments of a fourth aspect of the present disclosure provide a non-transitory computer readable storage medium, having stored therein computer programs that, when executed by a processor, implements the text processing method based on ambiguous entity words according to embodiments of the first aspect of the present disclosure.

Embodiments of a fifth aspect of the present disclosure provide a computer program product, when instructions in the computer program product is executed by a processor, implements the text processing method based on ambiguous entity words according to embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
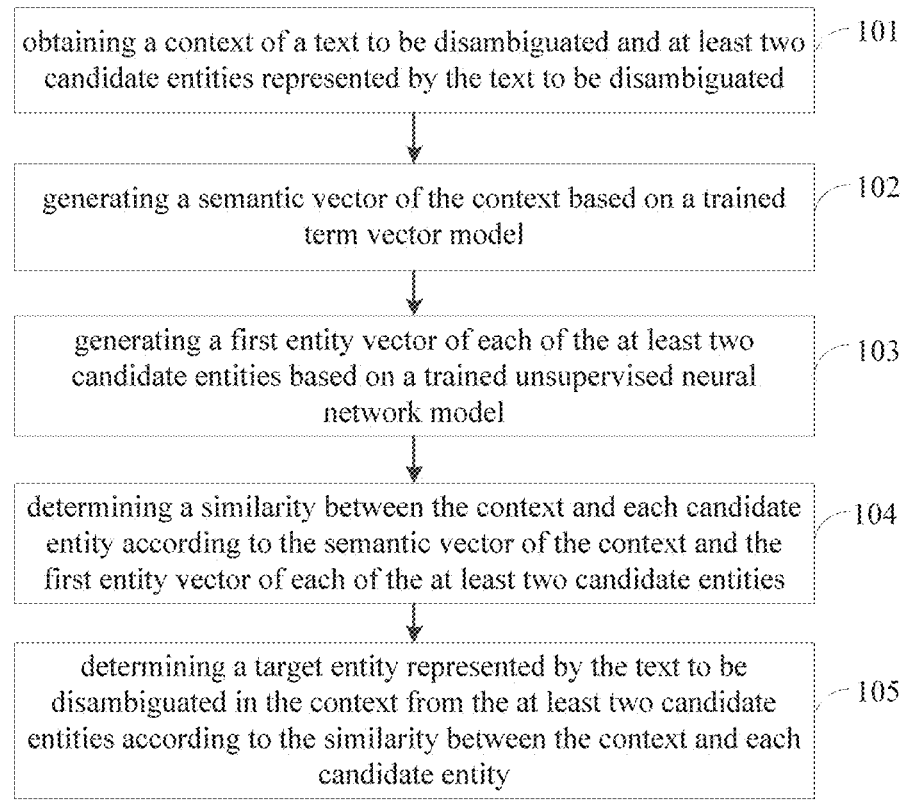
FIG. 1 is a flow chart of a text processing method based on ambiguous entity words according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A text processing method and device based on ambiguous entity words according to embodiments of the present disclosure will be descripted with reference to drawings in the following.

FIG. 1 is a flow chart of a text processing method based on ambiguous entity words according to an embodiment of the present disclosure.

As illustrated in FIG. 1, the method includes following actions.

At block 101, a context of a text to be disambiguated and at least two candidate entities represented by the text to be disambiguated are obtained.

In detail, a text set containing the text to be disambiguated is obtained from a knowledge base, and a word-segmentation algorithm is performed on the text set. As a possible implementation, a Chinese word-segmentation system (such as Ictclas) algorithm may be used to perform part-of-speech tagging and word-segmentation. Then stop words are removed according to a stop words table, to obtain a plurality of characters or words that forming an entity set. A window with a fixed size and centered on the text to be disambiguated is selected in the entity set. Words in the window are the context of the text to be disambiguated. The context of the text to be disambiguated may be represented by matrix A: $A=[w_1 \ w_2 \ w_3 \ w_4 \ldots w_N]$, in which N is a length of the context of the text to be disambiguated. Searching in the knowledge base, an entity represented by the text to be disambiguated is compared with an entity represented by each text in the knowledge base. If the entity represented by the text to be disambiguated is same as an entity represented by a text in the knowledge base, the entity represented by the text may be regarded as a candidate entity represented by the text to be disambiguated. A number of the candidate entities may be at least two. The at least two candidate entities have different semantics. For example, there are two candidate entities, one is an "apple" representing the iphone, and the other is an "apple" representing a fruit. Both the two entities are "apple", but semantics of the two entities are different.

At block 102, a semantic vector of the context is generated based on a trained word vector model.

In detail, the context of the text to be disambiguated is input to the trained word vector model. A semantic vector table corresponding to all entities in the knowledge base is already generated in the trained word vector model. A semantic vector corresponding to each word in the context of the text to be disambiguated may be obtained by looking up in the table. As a possible implementation, the word vector model in an embodiment of the present disclosure may be a word2vec model. A word may be represented as a real number vector based on the word2vec model. For example, superstar may be represented as a word vector of [0.792, −0.177, −0.107, 0.109, −0.542, . . . ].

At block 103, a first entity vector of each of the at least two candidate entities is generated based on a trained unsupervised neural network model.

In detail, the at least two candidate entities are input to the trained unsupervised neural network model, and vectors respectively corresponding to the least two candidate entities are generated. Since a supervised neural network model and the unsupervised neural network model are involved in the present disclosure, for ease of distinction, a vector generated by the unsupervised neural network model is referred to as the first entity vector, and a vector generated by the supervised neural network model is referred to as a second entity vector.

It should be noted that, text semantics of respective entities and a relationship between the entities have been learned by the unsupervised neural network model. The reason is as follows. Although the unsupervised neural network model is configured to depict potential semantic information of entities by using the relationship between the entities, the unsupervised neural network model is obtained by further training based on data generated by the supervised neural network model. The supervised neural network model may depict text semantic information of entities by using related key information of the entities. Thereby, the unsupervised neural network model may be trained by using the text semantic information of the entities generated by the supervised neural network model, such that the unsupervised neural network model can learn the text semantics of respective entities and the relationship between the entities, completely depicting the entity information. Detailed description of generating and training process of the supervised neural network model and the unsupervised neural network model will be made in subsequent embodiments.

At block 104, a similarity between the context and each candidate entity is determined according to the semantic vector of the context and the first entity vector of each of the at least two candidate entities.

In detail, before determining the similarity between the context and each candidate entity, the obtained semantic vector of the context may be input to the unsupervised neural network model. The unsupervised neural network model includes three layers, i.e., an input layer, a hidden layer, and an output layer. The semantic vector of the context is input to the input layer of the unsupervised neural network model, and a weight in the output layer of the unsupervised neural network model is regarded as a first entity vector corresponding to the context. A similarity between the first entity vector corresponding to the context and the first entity vector of each of the at least two candidate entities is calculated. As a possible implementation, a layer model is activated (LogisticRegression), that is, the output layer of the unsupervised neural network model is trained, thus the similarity may be directly calculated.

It should be noted that, the semantic vector of the context is input to the unsupervised neural network model, and the first entity vector corresponding to the context is obtained, thus the first entity vector corresponding to the context and the first entity vectors corresponding to the at least two candidate entities are in a same vector space, thus facilitating similarity calculation.

At block 105, a target entity represented by the text to be disambiguated in the context is determined from the at least two candidate entities according to the similarity between the context and each candidate entity.

In detail, the similarity between the context and each candidate entity is obtained by calculation, a candidate entity with a highest similarity to the context is determined, and the candidate entity is determined as the target entity represented by the text to be disambiguated in the context, that is, original meaning of the text to be disambiguated is restored, realizing the disambiguation of the entity.

With the text processing method based on ambiguous entity words according to embodiments of the present disclosure, the context of the text to be disambiguated and the at least two candidate entities represented by the text to be disambiguated are obtained, the semantic vector of the context is generated based on the trained word vector model, the first entity vector of each of the at least two candidate entities is generated based on the trained unsupervised neural network model, the similarity between the context and each candidate entity is determined according to the semantic vector of the context and the first entity vector of each of the at least two candidate entities, and the target entity represented by the text to be disambiguated in the context is determined from the at least two candidate entities. By processing the candidate entities with the unsupervised neural network model that has trained and learned the text semantics of respective entities and the relationship between the entities, the first entity vector is generated, and the first entity vector of each of the at least two candidate entities contains text semantics of the candidate entities and the relationship between the entities, achieving completely depiction of the entity information, then the similarity is determined according to the first entity vector and the semantic vector of the context of the text to be disambiguated, and the target entity represented by the text to be disambiguated in the context, thus improving accuracy and efficiency of disambiguation for the text to be disambiguated, solving a problem of low accuracy of entity disambiguation in the knowledge base due to that the text semantics of respective entities and the relationship between the entities cannot be acquired at the same time.

Before generating the semantic vector of the context based on the word vector model, the word vector model may be firstly trained according to an application scene to obtain a word vector model conforms to the application scene. Therefore, this process is described in embodiments of the present disclosure.

Figure 2:
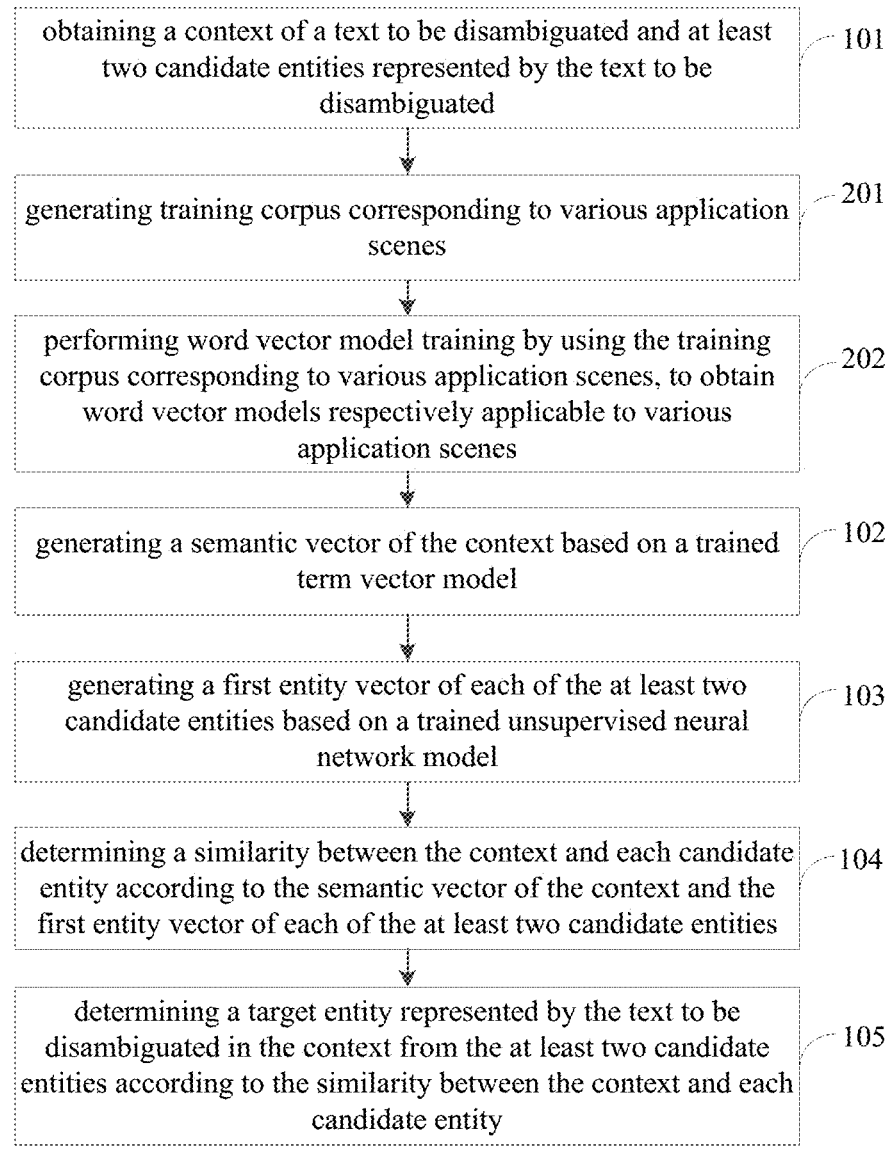
FIG. 2 is a flow chart of a text processing method based on ambiguous entity words according to another embodiment of the present disclosure.

Accordingly, the present disclosure provides another text processing method based on ambiguous entity words. FIG. 2 is a flow chart of a text processing method based on ambiguous entity words according to another embodiment of the present disclosure, in which a process of generating the word vector model is clearly described. As illustrated in FIG. 2, the method may further include following actions before the step at block 102 based on above embodiment.

At block 201, training corpus corresponding to various application scenes is generated.

In detail, for different application scenes, different training corpus is used. For example, in a searching application scene, the corresponding training corpus may be established by using a search log. In an application scene of webpage text understanding, the training corpus may be established by using webpages. As a possible implementation, in an embodiment, the corresponding corpus may be generated in different application scenes based on a user searching log and a knowledge base. Data amount of the user searching log and the knowledge base data is large, thus making the training corpus to be rich, and improving the training effect.

At block 202, word vector model training is performed by using the training corpus corresponding to various application scenes, to obtain word vector models respectively applicable to various application scenes.

In detail, after corresponding training corpus is determined according to the application scene, word-segmentation is performed on the training corpus. As a possible implementation, a Chinese word-segmentation system (such as Ictclas) algorithm may be used to perform word-segmentation on a plurality of documents in the training corpus, and stop words are removed according to a stop words table, thus a plurality of segments of characters or words are obtained. Each segment is a term, that is, each term represents one word or one character. Each term is separated by a space. For example, for easy to distinguish different segments, different segments are numbered, which may be expressed as term1 term2 term3 term4 term5 . . . .

In addition, training is performed by using the word vector model. As a possible implementation, the word vector model in an embodiment of the present disclosure may be a word2vec model. This model is an efficient algorithm model configured to represent a word as a real number vector. By using an idea of deep learning, processing of text content may be simplified into a vector in a K-dimensional vector space through training, and then a similarity in vector space may be obtained by operation between vectors, and the similarity in the vector space may be used to represent a text semantic similarity. In detail, skipgram method in the word2vec model may be used to train the training corpus of a certain application scene in embodiments of the present disclosure, to obtain a semantic vector table corresponding to words of different application scenes, thus obtaining the word vector model applicable to respective application scenes.

With the text processing method based on ambiguous entity words according to embodiments of the present disclosure, by training the word vector model according to the application scene, the word vector model applicable to various application scenes is obtained, such that the context of the text to be disambiguated may be processed in different application scenes when the disambiguation needs to be performed. The semantic vector corresponding to the context is generated by looking up in the table, and the first entity vector is generated for each of the at least two candidate entities represented by the text to be disambiguated by the unsupervised neural network model having learned and obtained text semantics of respective entities and the relationship between the entities, such that the entity information is completely depicted. And then, similarity calculation is performed according to the semantic vector of the context and the first entity vector of each candidate entity, and the target entity represented by the text to be disambiguated in the context is determined from the at least two candidate entities. Thus accuracy of disambiguation is improved. At the same time, since the training of the word vector model is based on a largest knowledge base, thus the disambiguation effect on a multi-ambiguous entity with a same name and different meanings is well.

In above embodiments, the candidate entities are input to the trained unsupervised neural network model, and the first entity vector is obtained. Training of the unsupervised neural network model requires use of data output by the supervised neural network model. Therefore, a generating and training process of the supervised neural network model and a process of training the unsupervised neural network model after the training of supervised neural network model is finished will be described in following embodiments.

Figure 3:
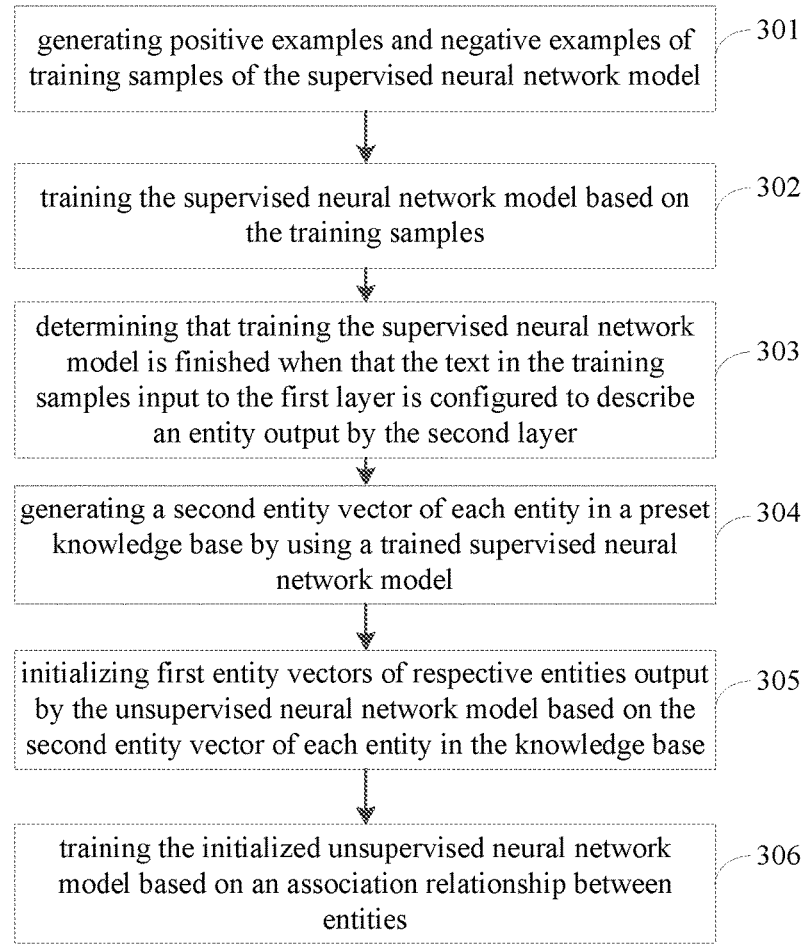
FIG. 3 is a flow chart of a text processing method based on ambiguous entity words according to yet another embodiment of the present disclosure.

Based on above embodiments, the present disclosure further provides a possible implementation of the text processing method based on ambiguous entity words. FIG. 3 is a flow chart of a text processing method based on ambiguous entity words according to yet another embodiment of the present disclosure. As illustrated in FIG. 3, the method may further include following actions before the step at block 103.

At block 301, positive examples and negative examples of training samples of the supervised neural network model are generated.

A process for generating the positive examples of the training samples may be as follows. Each entity in the knowledge base has a related attribute and an attribute value, and each entity may have introduction information thereof. The positive examples of the training samples may be generated by extracting keyword according to the attribute of each entity and the introduction information of each entity. For example, an entity "Andy Lau" has a lot of attributes, such as an attribute of "wife", an attribute of "daughter". An attribute value of "wife" is "Zhu Liqian", and an attribute value of "daughter" is "Liu Xianghui". There may be many related attributes, which are not listed here.

The entity "Andy Lau" may further has related introduction information, for example, Andy Lau, born in Hong Kong on Sep. 27, 1961, is an actor, singer, producer, lyricist. His magnum opus includes "The Condor Heroes", "Infernal Affairs", "Bombing Expert" and so on. The keywords of the entity "Andy Lau" may be extracted according to this introduction information. For example, the keywords may include actor, singer, opus "Infernal Affairs", and the like.

Therefore, Zhu Liqian, Liu Xianghui, actor, singer, opus "Infernal Affairs" may be regarded as positive examples of the training samples of entity "Andy Lau".

A process for generating the negative examples of the training samples may be as follows. After word-segmentation is performed on all text description information of respective entities in the knowledge base, term frequency statistics is performed on terms obtained by the word-segmentation. Negative sampling is performed on each term based on a term frequency of each term, to obtain the negative examples of the training samples. In actual test, the inventor found that, effect of training with the negative examples determined by performing the negative sampling based on the term frequency is better than that of training with negative examples determined by completely randomly performing the negative sampling. Thus training with the negative examples determined by performing the negative sampling based on the term frequency improves model training speed and model training effect.

For example, a term and term frequency table may be generated according to each term and the term frequency of each term, in which the terms are ordered according to the term frequency from large to small, as illustrated in Table 1.

TABLE 1 term and term frequency table

| term | term frequency |
|---|---|
| teacher | 113132 |
| police | 100099 |
| website | 10000 |
| love | 9502 |
| show | 8000 |
| sadness | 4119 |
| ... | ... |

As a possible implementation, the negative sampling may be performed based on the term frequency according to the term and term frequency table in Table 1. Terms determined by a result of the negative sampling are determined as the negative samples of training. Compared with random negative sampling, this implementation makes the effect of model training better.

At block 302, the supervised neural network model is trained based on the training samples.

The supervised neural network model includes two layers, i.e., a first layer configured to input a semantic vector of text in the training samples, and a second layer configured to predict an entity described by the text input in the first layer. As a possible implementation, the two layers of the supervised neural network model may be connected and trained by using a document vector (Doc2vec) technology. In detail, input of the supervised neural network model (i.e., the input of the first layer) is the semantic vector of the text in the training samples. That is, the text of entities corresponding to the training samples is input to the word vector model in the embodiment illustrated in FIG. 2, and a text semantic vector corresponding to the text is generated. The text semantic vector is input to the first layer of the supervised neural network model, and then the entity described by the text input in the first layer may be predict by the second layer.

At block 303, it is determined that training the supervised neural network model is finished when the text in the training samples input to the first layer is configured to describe an entity output by the second layer.

In detail, when the text in the training samples input to the first layer is configured to describe the entity output by the second layer, it indicates that parameters of the second layer may be configured to accurately predict an entity described by the text of training samples input in the first layer, and the training effect corresponding to the parameters is well. Thus the parameters are determined, and training the supervised neural network model is finished. The two-layer setting mode of the supervised neural network model makes the supervised neural network model can learn semantic of each entity and determine correspondence relationship between the text and the entity after training the supervised neural network model is finished.

At block 304, a second entity vector of each entity in a preset knowledge base is generated by using a trained supervised neural network model.

In detail, the parameters of the second layer are determined in the trained supervised neural network model. The second entity vector corresponding to each entity in the knowledge base may be generated based on the parameters in the second layer by inputting each entity in the knowledge base to the trained supervised neural network model.

At block 305, first entity vectors of respective entities output by the unsupervised neural network model is initialized based on the second entity vector of each entity in the knowledge base.

In detail, the input of the unsupervised neural network model is the entities in the knowledge base. After the entities are input to the unsupervised neural network model, the first entity vector corresponding to each entity is generated. The first entity vector is a random number sequence generated randomly. The first entity vector corresponding to each entity may be continuously updated in subsequent training process, and a first entity vector confirming to a target requirement is finally obtained. The second entity vectors of each entity in the knowledge base output by the supervised neural network model is input to the unsupervised neural network model, so as to initialize the first entity vectors of respective entities output by the unsupervised neural network. That is, the output of the unsupervised neural network is replaced by the second entity vector of each entity, thus reducing the number of iterations during training the unsupervised neural network model, and improving training speed and training effect. At the same time, the second entity vector has learned the relationship between the text and the entity. When the second entity vector is input to the unsupervised neural network model for training, the relationship between the text and the entity learned by the unsupervised neural network model may be utilized. Thereby, the first entity vector containing the relationship between the text and the entity and the relationship between the entities may be finally output.

At block 306, the initialized unsupervised neural network model is trained based on an association relationship between entities.

In detail, training the initialized unsupervised neural network model is performed based on entities in the knowledge base that have the association relationship, and/or based on entities in a search log that have a co-occurrence relationship. It is determined that training the unsupervised neural network model is finished when a distance between first entity vectors output by the unsupervised neural network model corresponds to a closeness between entities.

Figure 4:
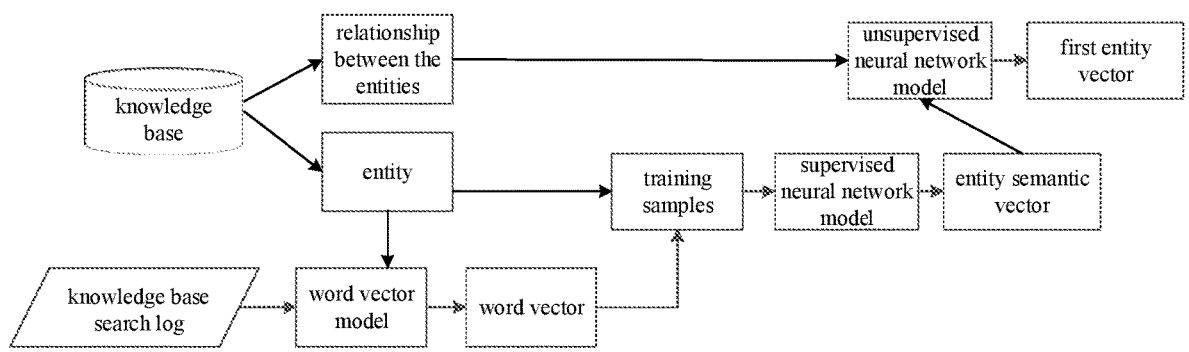
FIG. 4 is a schematic diagram illustrating strategy and framework between respective models based on a knowledge base according to an embodiment of the present disclosure.

To further explain above process, FIG. 4 is a schematic diagram illustrating strategy and framework between respective models based on a knowledge base according to an embodiment of the present disclosure. As illustrated in FIG. 4, the word vector model generates a word vector based on a search log of a user and the knowledge base, the supervised neural network model generating the training samples based on the knowledge base, the training samples is input to the word vector model to generate a word vector corresponding to the training samples, the word vector corresponding to the training samples is input to the supervised neural network model to generate an entity semantic vector (i.e., the second entity vector of each entity) that has learned semantics of respective entities.

Thereby, the generated second entity vector is input to the unsupervised neural network model by the supervised neural network model, to initialize the first entity vector of the unsupervised neural network model. Then the first entity vector that has learned semantics of respective entities and the relationship between the entities is generated. Thus the entity information is completely depicted, improving accuracy of the disambiguation processing.

With the text processing method based on ambiguous entity words according to embodiments of the present disclosure, by training the supervised neural network model, the supervised neural network model may learn the semantics of respective entities, by initializing the unsupervised neural network model based on the second entity vector of each entity generated by the supervised neural network model, the unsupervised neural network model may learn the semantics of respective entities and the relationship between the entities, thus fully using the data, and completely depicting the entity information. The first entity vector is generated by processing the candidate entity using the unsupervised neural network model, and the similarity is calculated based on the first entity vector and the sematic vector of the context of the text to be disambiguated, thus improving the disambiguation accuracy of the text to be disambiguated.

Figure 5:
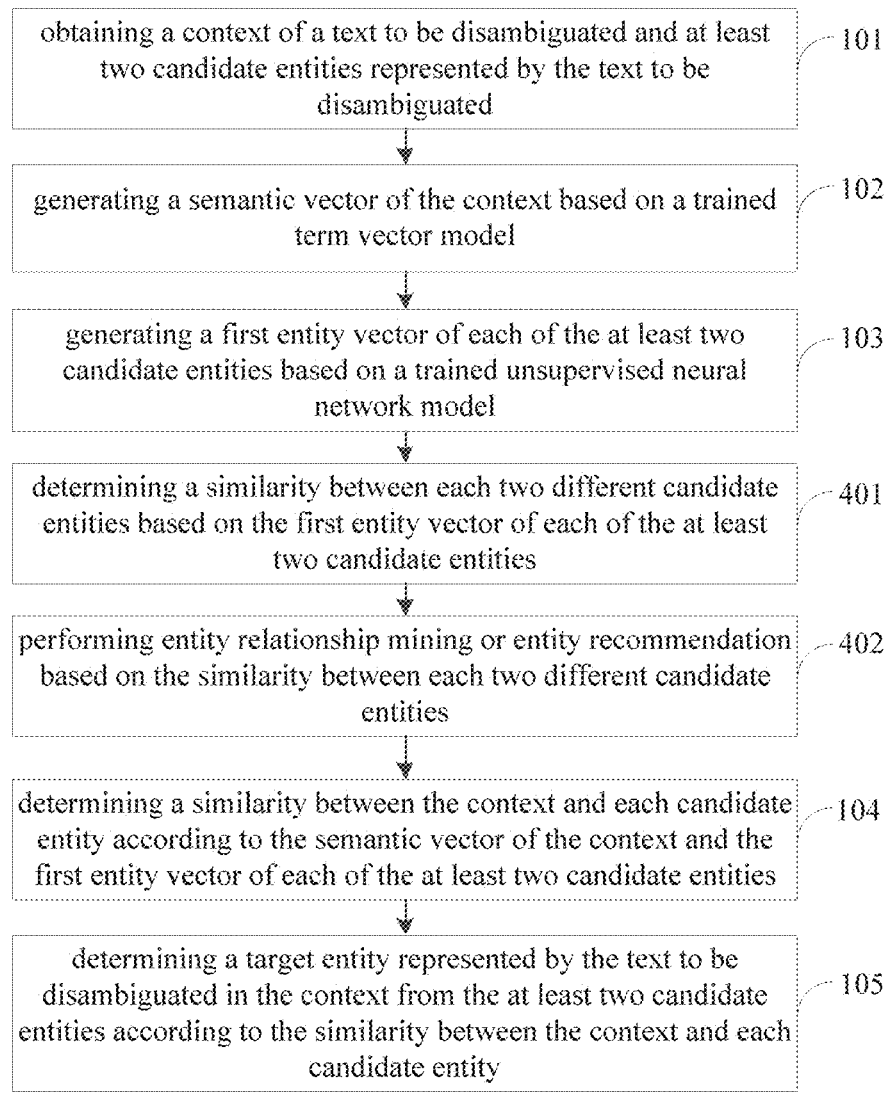
FIG. 5 is a flow chart of a text processing method based on ambiguous entity words according to still another embodiment of the present disclosure.

Based on above embodiments, the present disclosure further provides a possible implementation of the text processing method based on ambiguous entity words. FIG. 5 is a flow chart of a text processing method based on ambiguous entity words according to still another embodiment of the present disclosure. As illustrated in FIG. 5, the method may further include following actions after the step at block 103.

At block 401, a similarity between each two different candidate entities is determined based on the first entity vector of each of the at least two candidate entities.

As a possible implementation, the similarity between the first entity vectors of any two of the at least candidate entities may be calculated, using a cosine distance algorithm, based on the first entity vector of each of the at least two candidate entities.

At block 402, entity relationship mining or entity recommendation is performed based on the similarity between each two different candidate entities.

In detail, the similarity between each two different candidate entities is obtained through calculation. As a possible implementation, the similarity is compared with a preset threshold. When the similarity is greater than the threshold, it is determined that there is an entity relationship between the two candidate entities corresponding to the similarity, and an edge relationship of entities is added in a knowledge graph. The edge relationship may be used for the entity recommendation. For example, in a searching application scene, when a user searches for one entity, another related entity may be recommended, thus improving searching efficiency.

With the text processing method based on ambiguous entity words according to embodiments of the present disclosure, the context of the text to be disambiguated and the at least two candidate entities represented by the text to be disambiguated are obtained, the semantic vector of the context is generated based on the trained word vector model, the first entity vector of each of the at least two candidate entities is generated based on the trained unsupervised neural network model, the similarity between the context and each candidate entity is determined according to the semantic vector of the context and the first entity vector of each of the at least two candidate entities, and the target entity represented by the text to be disambiguated in the context is determined from the at least two candidate entities. By processing the candidate entities with the unsupervised neural network model that has trained and learned the text semantics of respective entities and the relationship between the entities, the first entity vector is generated, and the first entity vector of each of the at least two candidate entities contains text semantics of the candidate entities and the relationship between the entities, and the similarity is calculated based on the first entity vector and the sematic vector of the context of the text to be disambiguated, thus improving the accuracy of disambiguation for the text to be disambiguated. At the same time, the similarity between different candidate entities is calculated based on the generated first entity vector, the similarity may be used to perform entity relationship mining or entity recommendation, thus increasing edge relationship between entities.

To implement above embodiments, the present disclosure further provide a text processing device based on ambiguous entity words.

Figure 6:
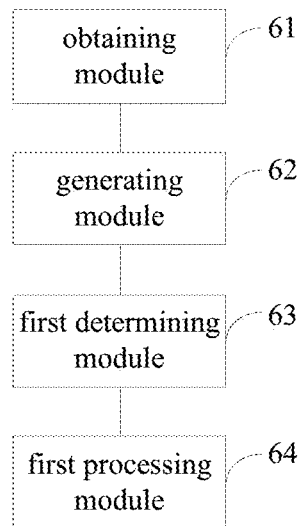
FIG. 6 is a schematic diagram illustrating a text processing device based on ambiguous entity words according to an embodiment of the present disclosure.

FIG. 6 is a schematic diagram illustrating a text processing device based on ambiguous entity words according to an embodiment of the present disclosure.

As illustrated in FIG. 6, the device includes an obtaining module 61, a generating module 62, a first determining module 63, and a first processing module 64.

The obtaining module 61 is configured to obtain a context of a text to be disambiguated and at least two candidate entities represented by the text to be disambiguated. The at least two candidate entities have different semantics.

The generating module 62 is configured to generate a semantic vector of the context based on a trained word vector model, and to generate a first entity vector of each of the at least two candidate entities based on a trained unsupervised neural network model. Text semantics of respective entities and a relationship between entities have been learned by the unsupervised neural network model.

The first determining module 63 is configured to determine a similarity between the context and each candidate entity according to the semantic vector of the context and the first entity vector of each of the at least two candidate entities.

The first processing module 64 is configured to determine a target entity represented by the text to be disambiguated in the context from the at least two candidate entities according to the similarity between the context and each candidate entity.

It should be noted that, descriptions for foregoing method embodiments are applicable to the device embodiment, which is not elaborate herein.

With the text processing device based on ambiguous entity words according to embodiments of the present disclosure, the obtaining module is configured to obtain the context of the text to be disambiguated and the at least two candidate entities represented by the text to be disambiguated, the generating module is configured to generate the semantic vector of the context based on the trained word vector model, to generate the first entity vector of each of the at least two candidate entities based on the trained unsupervised neural network model, the first determining module is configured to determine the similarity between the context and each candidate entity according to the semantic vector of the context and the first entity vector of each of the at least two candidate entities, and the first processing module 64 is configured to determine the target entity represented by the text to be disambiguated in the context from the at least two candidate entities. By processing the candidate entities with the unsupervised neural network model that has trained and learned the text semantics of respective entities and the relationship between the entities, the first entity vector is generated, and the first entity vector of each of the at least two candidate entities contains text semantics of the candidate entities and the relationship between the entities, the similarity is calculated based on the first entity vector and the sematic vector of the context of the text to be disambiguated, and the target entity represented by the text to be disambiguated in the context is determined, thus improving accuracy and efficiency of disambiguation for the text to be disambiguated, solving a problem of low accuracy of entity disambiguation in the knowledge base due to that the text semantics of respective entities and the relationship between the entities cannot be acquired at the same time.

Figure 7:
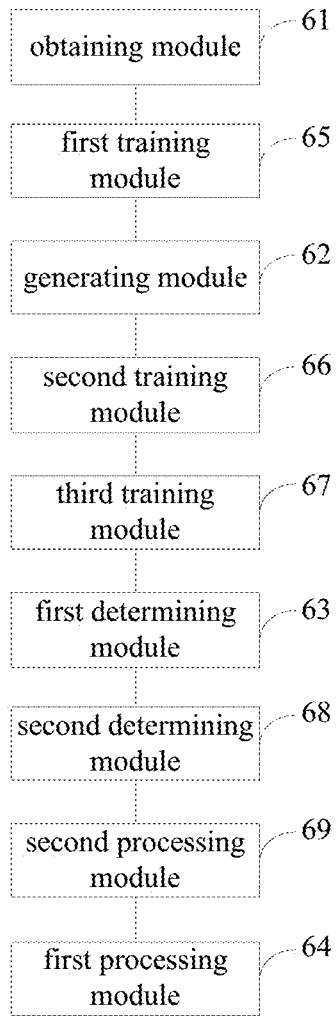
FIG. 7 is a schematic diagram illustrating a text processing device based on ambiguous entity words according to another embodiment of the present disclosure.

Base on above embodiments, the present disclosure further provides a possible implementation of the text processing device based on ambiguous entity words. FIG. 7 is a schematic diagram illustrating a text processing device based on ambiguous entity words according to another embodiment of the present disclosure. As illustrated in FIG. 7, based on the above embodiment illustrated in FIG. 6, the device further include a first training module 65, a second training module 66, a third training module 67, a second determining module 68 and a second processing module 69.

The first training module 65 is configured to generate training corpus corresponding to various application scenes, to perform word vector model training by using the training corpus corresponding to various application scenes, to obtain word vector models respectively applicable to various application scenes.

The second training module 66 is configured to generate positive examples of training samples based on an attribute of each entity in the knowledge base and a keyword extracted from introduction information of each entity, to generate negative examples of the training samples based on all text description information of respective entities in the knowledge base, to train the supervised neural network model based on the training samples, and to determine that training the supervised neural network model is finished when the text in the training samples input to the first layer is configured to describe an entity output by the second layer. The supervised neural network model comprises: a first layer configured to input a semantic vector of text in the training samples, and a second layer configured to predict an entity described by the text input in the first layer, a parameter of the second layer is configured to generate the second entity vector.

As a possible implementation, the second training module 66 may be further configured to perform word-segmentation on all text description information of respective entities in the knowledge base, to perform term frequency statistics on terms obtained by the word-segmentation, and to perform negative sampling on each term based on a term frequency of each term to obtain the negative examples of the training samples.

The third training module 67 is configured to generate a second entity vector of each entity in a preset knowledge base by using a trained supervised neural network model, in which semantics of respective entities have been learned by the supervised neural network model, to initialize first entity vectors of respective entities output by the unsupervised neural network model based on the second entity vector of each entity in the preset knowledge base, and to train the initialized unsupervised neural network model based on an association relationship between entities.

As a possible implementation, the third training module 67 is further configured to train the initialized untrained unsupervised neural network model based on entities in the knowledge base that have the association relationship, and/or based on entities in a search log that have a co-occurrence relationship, and to determine that training the unsupervised neural network model is finished when a distance between first entity vectors output by the unsupervised neural network model corresponds to a closeness between entities.

The second determining module 68 is configured to determine a similarity between each two different candidate entities based on the first entity vector of each of the at least two candidate entities.

The second processing module 69 is configured to perform entity relationship mining or entity recommendation based on the similarity between each two different candidate entities.

It should be noted that, descriptions for foregoing method embodiments are applicable to the device embodiment, which is not elaborate herein.

With the text processing device based on ambiguous entity words according to embodiments of the present disclosure, the obtaining module is configured to obtain the context of the text to be disambiguated and the at least two candidate entities represented by the text to be disambiguated, the generating module is configured to generate the semantic vector of the context based on the trained word vector model, to generate the first entity vector of each of the at least two candidate entities based on the trained unsupervised neural network model, the first determining module is configured to determine the similarity between the context and each candidate entity according to the semantic vector of the context and the first entity vector of each of the at least two candidate entities, and the first processing module 64 is configured to determine the target entity represented by the text to be disambiguated in the context from the at least two candidate entities. By processing the candidate entities with the unsupervised neural network model that has trained and learned the text semantics of respective entities and the relationship between the entities, the first entity vector is generated, and the first entity vector of each of the at least two candidate entities contains text semantics of the candidate entities and the relationship between the entities, the similarity is calculated based on the first entity vector and the sematic vector of the context of the text to be disambiguated, and the target entity represented by the text to be disambiguated in the context is determined, thus improving accuracy and efficiency of disambiguation for the text to be disambiguated, solving a problem of low accuracy of entity disambiguation in the knowledge base due to that the text semantics of respective entities and the relationship between the entities cannot be acquired at the same time.

To implement above embodiments, the present disclosure further provide a computer device, including: a memory, a processor and computer programs stored on the memory and executable by the processor. When the processor executes the computer programs, the computer device implements the text processing method based on ambiguous entity words according to foregoing method embodiments of the present disclosure.

To implement above embodiments, the present disclosure further provide a non-transitory computer readable storage medium, having stored therein computer programs that, when executed by a processor, implements the text processing method based on ambiguous entity words according to foregoing method embodiments of the present disclosure.

To implement above embodiments, the present disclosure further provide a computer program product, when instructions in the computer program product is executed by a processor, implements the text processing method based on ambiguous entity words according to foregoing method embodiments of the present disclosure.

Figure 8:
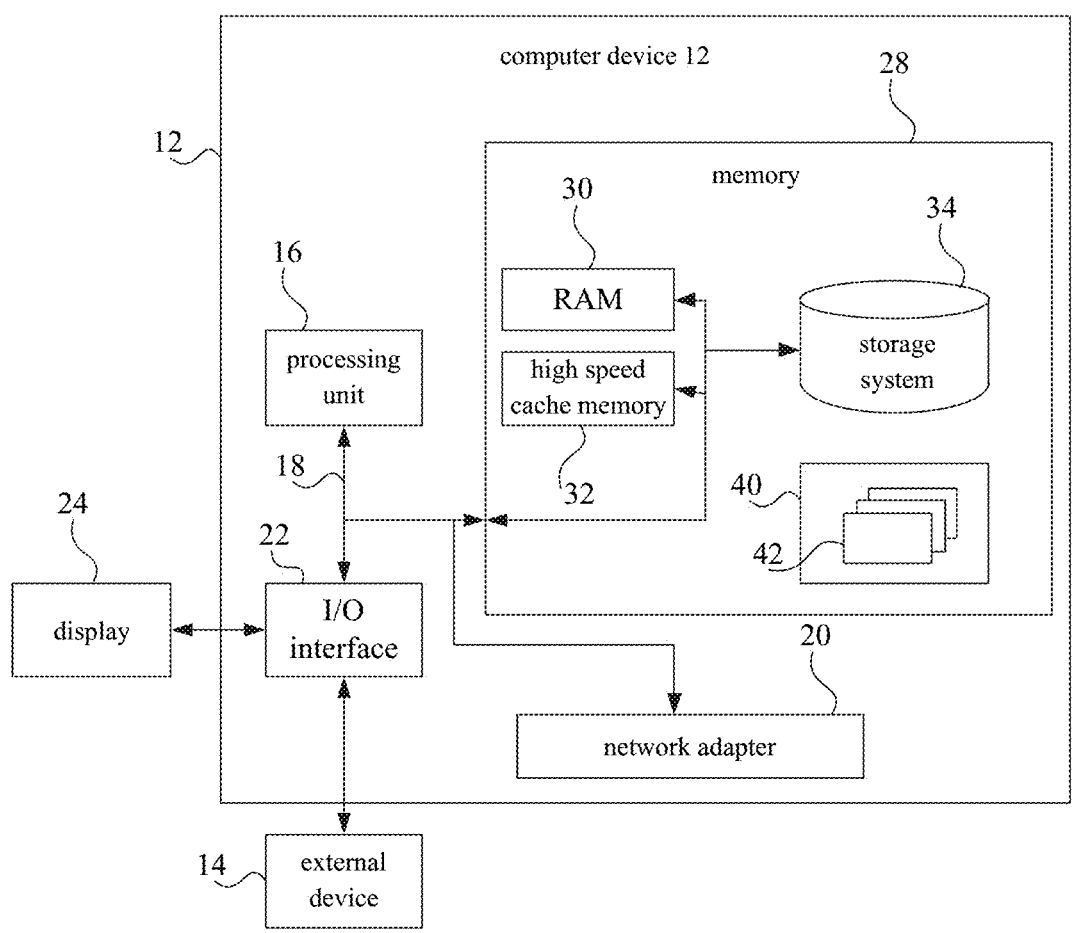
FIG. 8 is schematic diagram illustrating a computer device applicable to implementing implementation of the present disclosure.

FIG. 8 is schematic diagram illustrating a computer device applicable to implementing implementation of the present disclosure. The computer device 12 illustrated in FIG. 8 is merely an example, which should not be understood to bring any limitation to functions and application scope of embodiments of the present disclosure.

As illustrated in FIG. 8, the computer device 12 is represented in a form of a general computer device. Components of the computer device 12 may include but may not be limited to one or more processors or processing units 16, a system memory 28, and a bus 18 that connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an enhanced ISA bus, and a Video Electronics Standards Association (VESA) local bus and a Peripheral Component Interconnection (PCI) bus.

The computer device 12 typically includes a variety of computer system readable media. These media may be any available media accessible by the computer device 12 and include volatile and nonvolatile media, removable and non-removable media.

The memory 28 may include a computer system readable medium in the form of volatile memory, such as a Random Access Memory (RAM) 30 and/or a high speed cache memory 32. The computer device 12 may further include other removable or non-removable, volatile or non-volatile computer system storage media. By way of example only, the storage system 34 may be configured to read from and write to a non-removable, non-volatile magnetic medium (not shown in FIG. 8, commonly referred to as "hard drive"). Although not shown in FIG. 8, a magnetic disk driver for reading from and writing to a removable and non-volatile disk (such as a "floppy disk"), and an optical disk driver for reading from and writing to a removable and non-volatile optical disk (for example, a compact disk read-only memory (CD-ROM), a Digital Video Disc Read Only Memory (DVD-ROM) or other optical media) may be provided. In these cases, each driver may be coupled to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more other computer devices. This communication can be performed via the input/output (I/O) interface 22. Also, the computer device 12 may communicate with one or more networks (such as a local area network, a wide area network and/or a public network such as an Internet) through a network adapter 20. As illustrated, the network adapter 20 communicates with other modules of the computer device 12 via the bus 18. It should be understood that, although not shown, other hardware and/or software modules may be used in connection with the computer device 12. The hardware and/or software includes, but is not limited to, microcode, device drivers, redundant processing units, external disk drive arrays, RAID systems, tape drives and data backup storage systems.

The processing unit 16 is configured to execute various functional applications and data processing by running programs stored in the system memory 28, thus implementing the method mentioned in above embodiments.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, such as two or three, unless specified otherwise.

Any process or method described herein in the flow chart or in other manners may be understood to represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A text processing method based on ambiguous entity words, comprising:
    obtaining a context of a text to be disambiguated and at least two candidate entities represented by the text to be disambiguated, wherein the at least two candidate entities have different semantics;
    generating a semantic vector of the context based on a trained word vector model;
    generating a first entity vector of each of the at least two candidate entities based on a trained unsupervised neural network model, wherein text semantics of respective entities and a relationship between respective entities have been learned by the unsupervised neural network model;
    determining a similarity between the context and each candidate entity according to the semantic vector of the context and the first entity vector of each of the at least two candidate entities; and
    determining a target entity represented by the text to be disambiguated in the context from the at least two candidate entities according to the similarity between the context and each candidate entity,
    wherein the unsupervised neural network model in which the text semantics of respective entities and the relationship between respective entities have been learned is obtained by the following steps:
        inputting a semantic vector corresponding to a text of each entity in a preset knowledge base to a trained supervised neural network model, to generate a second entity vector of the entity, wherein semantics of respective entities have been learned by the supervised neural network model, and the second entity vector of the entity is an entity semantic vector that has learned the semantic of the entity;

initializing a first entity vector of each entity output by the unsupervised neural network model based on the second entity vector of the entity in the preset knowledge base; and training the initialized unsupervised neural network model based on an association relationship between respective entities, wherein, the determining the similarity between the context and each candidate entity according to the semantic vector of the context and the first entity vector of each of the at least two candidate entities comprises:

inputting the semantic vector of the context to the unsupervised neural network model, to obtain the first entity vector corresponding to the context, so as to calculate the similarity between the first entity vector corresponding to the context and the first entity vectors corresponding to the at least two candidate entities in a same vector space, wherein generating a semantic vector of the context based on a trained word vector model comprises:

inputting the context of the text to be disambiguated to the trained word vector model to obtain a semantic vector corresponding to each word in the context of the text to be disambiguated, wherein initializing the first entity vector of each entity output by the unsupervised neural network model based on the second entity vector of the entity in the preset knowledge base comprises:

inputting each entity in the knowledge base to an untrained unsupervised neural network model to generate an initial first entity vector corresponding to the entity, wherein the initial first entity vector is a random number sequence generated randomly; and replacing the initial first entity vector of each entity output from the unsupervised neural network model by the second entity vector corresponding to the entity output from the supervised neural network model, wherein training the initialized unsupervised neural network model based on an association relationship between respective entities comprises:

training the initialized unsupervised neural network model based on entities in the knowledge base that have the association relationship, and/or based on entities in a search log that have a co-occurrence relationship; and determining that training the unsupervised neural network model is finished when a distance between first entity vectors output by the unsupervised neural network model corresponds to a closeness between entities.

2. The method according to claim 1, further comprising:

generating positive examples of training samples based on an attribute of each entity in the knowledge base and a keyword extracted from introduction information of each entity;

generating negative examples of the training samples based on all text description information of respective entities in the knowledge base;

training the supervised neural network model based on the training samples, wherein the supervised neural network model comprises a first layer configured to input a semantic vector of text in the training samples and a second layer configured to predict an entity described by the text input in the first layer, and a parameter of the second layer configured to generate the second entity vector; and determining that training the supervised neural network model is finished when the text in the training samples input to the first layer is configured to describe an entity output by the second layer.

3. The method according to claim 2, wherein generating the negative examples of the training samples based on all text description information of respective entities in the knowledge base comprises:

performing word-segmentation on all text description information of respective entities in the knowledge base, and performing term frequency statistics on terms obtained by the word-segmentation; and performing negative sampling on each term based on a term frequency of each term, to obtain the negative examples of the training samples.

4. The method according to claim 1, further comprising:

generating training corpus corresponding to various application scenes; and performing word vector model training by using the training corpus corresponding to various application scenes, to obtain word vector models respectively applicable to various application scenes.

5. The method according to claim 1, further comprising:

determining a similarity between each two different candidate entities based on the first entity vector of each of the at least two candidate entities; and performing entity relationship mining or entity recommendation based on the similarity between each two different candidate entities.

6. A text processing device based on ambiguous entity words, comprising:

one or more processors;

a memory;

one or more programs, stored in the memory, when executed by the one or more processors, configured to perform following actions:

obtaining a context of a text to be disambiguated and at least two candidate entities represented by the text to be disambiguated, wherein the at least two candidate entities have different semantics;

generating a semantic vector of the context based on a trained word vector model;

generating a first entity vector of each of the at least two candidate entities based on a trained unsupervised neural network model, wherein text semantics of respective entities and a relationship between respective entities have been learned by the unsupervised neural network model;

determining a similarity between the context and each candidate entity according to the semantic vector of the context and the first entity vector of each of the at least two candidate entities; and determining a target entity represented by the text to be disambiguated in the context from the at least two candidate entities according to the similarity between the context and each candidate entity, wherein the unsupervised neural network model in which the text semantics of respective entities and the relationship between respective entities have been learned is obtained by the following steps:

inputting a semantic vector corresponding to a text of each entity in a preset knowledge base to a trained supervised neural network model, to generate a second entity vector of the entity, wherein semantics of respective entities have been learned by the supervised neural network model, and the second entity vector of the entity is an entity semantic vector that has learned the semantic of the entity;

initializing a first entity vector of each entity output by the unsupervised neural network model based on the second entity vector of the entity in the preset knowledge base; and training the initialized unsupervised neural network model based on an association relationship between respective entities, wherein, the determining the similarity between the context and each candidate entity according to the semantic vector of the context and the first entity vector of each of the at least two candidate entities comprises:

inputting the semantic vector of the context to the unsupervised neural network model, to obtain the first entity vector corresponding to the context, so as to calculate the similarity between the first entity vector corresponding to the context and the first entity vectors corresponding to the at least two candidate entities in a same vector space, wherein generating a semantic vector of the context based on a trained word vector model comprises:

inputting the context of the text to be disambiguated to the trained word vector model to obtain a semantic vector corresponding to each word in the context of the text to be disambiguated, wherein initializing the first entity vector of each entity output by the unsupervised neural network model based on the second entity vector of the entity in the preset knowledge base comprises:

inputting each entity in the knowledge base to an untrained unsupervised neural network model to generate an initial first entity vector corresponding to the entity, wherein the initial first entity vector is a random number sequence generated randomly;

replacing the initial first entity vector of each entity output from the unsupervised neural network model by the second entity vector corresponding to the entity output from the supervised neural network model, wherein training the initialized unsupervised neural network model based on an association relationship between respective entities comprises:

training the initialized unsupervised neural network model based on entities in the knowledge base that have the association relationship, and/or based on entities in a search log that have a co-occurrence relationship; and determining that training the unsupervised neural network model is finished when a distance between first entity vectors output by the unsupervised neural network model corresponds to a closeness between entities.

7. The device according to claim 6, wherein, the one or more processors are further configured to perform following actions:

generating positive examples of training samples based on an attribute of each entity in the knowledge base and a keyword extracted from introduction information of each entity;

generating negative examples of the training samples based on all text description information of respective entities in the knowledge base;

training the supervised neural network model based on the training samples, wherein the supervised neural network model comprises a first layer configured to input a semantic vector of text in the training samples and a second layer configured to predict an entity described by the text input in the first layer, and a parameter of the second layer configured to generate the second entity vector; and determining that training the supervised neural network model is finished when the text in the training samples input to the first layer is configured to describe an entity output by the second layer.

8. The device according to claim 7, wherein generating the negative examples of the training samples based on all text description information of respective entities in the knowledge base comprises:

performing word-segmentation on all text description information of respective entities in the knowledge base, and performing term frequency statistics on terms obtained by the word-segmentation; and performing negative sampling on each term based on a term frequency of each term, to obtain the negative examples of the training samples.

9. The device according to claim 6, wherein, the one or more processors are further configured to perform following actions:

generating training corpus corresponding to various application scenes; and performing word vector model training by using the training corpus corresponding to various application scenes, to obtain word vector models respectively applicable to various application scenes.

10. The device according to claim 6, wherein, the one or more processors are further configured to perform following actions:

determining a similarity between each two different candidate entities based on the first entity vector of each of the at least two candidate entities; and performing entity relationship mining or entity recommendation based on the similarity between each two different candidate entities.

11. A non-transitory computer readable storage medium, having stored therein computer programs that, when executed by a processor, implements the text processing method based on ambiguous entity words, wherein the method comprising:

obtaining a context of a text to be disambiguated and at least two candidate entities represented by the text to be disambiguated, wherein the at least two candidate entities have different semantics;

generating a semantic vector of the context based on a trained word vector model;

generating a first entity vector of each of the at least two candidate entities based on a trained unsupervised neural network model, wherein text semantics of respective entities and a relationship between respective entities have been learned by the unsupervised neural network model;

determining a similarity between the context and each candidate entity according to the semantic vector of the context and the first entity vector of each of the at least two candidate entities; and determining a target entity represented by the text to be disambiguated in the context from the at least two candidate entities according to the similarity between the context and each candidate entity, wherein the unsupervised neural network model in which the text semantics of respective entities and the relationship between respective entities have been learned is obtained by the following steps:

generating a second entity vector of each entity in a preset knowledge base by using a trained supervised neural network model, wherein semantics of respective entities have been learned by the supervised neural network model;

initializing first entity vectors of respective entities output by the unsupervised neural network model based on the second entity vector of each entity in the preset knowledge base; and training the initialized unsupervised neural network model based on an association relationship between respective entities, wherein, the determining the similarity between the context and each candidate entity according to the semantic vector of the context and the first entity vector of each of the at least two candidate entities comprises:

inputting the semantic vector of the context to the unsupervised neural network model, to obtain the first entity vector corresponding to the context, so as to calculate the similarity between the first entity vector corresponding to the context and the first entity vectors corresponding to the at least two candidate entities in a same vector space, wherein generating a semantic vector of the context based on a trained word vector model comprises:

inputting the context of the text to be disambiguated to the trained word vector model to obtain a semantic vector corresponding to each word in the context of the text to be disambiguated, wherein initializing the first entity vector of each entity output by the unsupervised neural network model based on the second entity vector of the entity in the preset knowledge base comprises:

inputting each entity in the knowledge base to an untrained unsupervised neural network model to generate an initial first entity vector corresponding to the entity, wherein the initial first entity vector is a random number sequence generated randomly;

replacing the initial first entity vector of each entity output from the unsupervised neural network model by the second entity vector corresponding to the entity output from the supervised neural network model, wherein training the initialized unsupervised neural network model based on an association relationship between respective entities comprises:

training the initialized unsupervised neural network model based on entities in the knowledge base that have the association relationship, and/or based on entities in a search log that have a co-occurrence relationship; and determining that training the unsupervised neural network model is finished when a distance between first entity vectors output by the unsupervised neural network model corresponds to a closeness between entities.

12. The storage medium according to claim 11, wherein the method further comprises:

generating positive examples of training samples based on an attribute of each entity in the knowledge base and a keyword extracted from introduction information of each entity;

generating negative examples of the training samples based on all text description information of respective entities in the knowledge base;

training the supervised neural network model based on the training samples, wherein the supervised neural network model comprises a first layer configured to input a semantic vector of text in the training samples and a second layer configured to predict an entity described by the text input in the first layer, and a parameter of the second layer configured to generate the second entity vector; and determining that training the supervised neural network model is finished when the text in the training samples input to the first layer is configured to describe an entity output by the second layer.

13. The storage medium according to claim 12, wherein generating the negative examples of the training samples based on all text description information of respective entities in the knowledge base comprises:

performing word-segmentation on all text description information of respective entities in the knowledge base, and performing term frequency statistics on terms obtained by the word-segmentation; and performing negative sampling on each term based on a term frequency of each term, to obtain the negative examples of the training samples.

14. The storage medium according to claim 11, wherein the method further comprises:

generating training corpus corresponding to various application scenes; and performing word vector model training by using the training corpus corresponding to various application scenes, to obtain word vector models respectively applicable to various application scenes.

\* \* \* \* \*